United States Patent [19]
Urewicz

[11] Patent Number: 5,541,980
[45] Date of Patent: Jul. 30, 1996

[54] CORDLESS TELEPHONE/RADIO-MONITORING SYSTEM

[75] Inventor: Lawrence F. Urewicz, Lake in the Hills, Ill.

[73] Assignee: Cobra Electronics Corporation, Chicago, Ill.

[21] Appl. No.: 330,197

[22] Filed: Oct. 27, 1994

[51] Int. Cl.⁶ .................................................. H04Q 7/20
[52] U.S. Cl. .......................... 379/61; 455/166.2; 379/48
[58] Field of Search ................... 455/38.1, 38.2, 455/57.1, 166.1, 166.2, 228; 379/37, 38, 58, 59, 60, 61, 63, 41, 42, 48

[56] References Cited

U.S. PATENT DOCUMENTS

| | | | |
|---|---|---|---|
| Re. 34,380 | 9/1993 | Sleevi | 379/67 |
| 3,739,390 | 6/1973 | Poppe, Jr. et al. | 343/729 |
| 4,122,304 | 10/1978 | Mallien, II | 179/2 EB |
| 4,980,660 | 12/1990 | Nakamura et al. | 333/101 |
| 5,060,293 | 10/1991 | Kok et al. | 455/78 |
| 5,091,930 | 2/1992 | Shapiro | 379/39 |
| 5,170,493 | 12/1992 | Roth | 455/82 |
| 5,193,218 | 3/1993 | Shimo | 455/80 |
| 5,200,735 | 4/1993 | Hines | 340/539 |
| 5,212,813 | 5/1993 | Renaud | 455/82 |
| 5,239,688 | 8/1993 | Dorrie et al. | 455/83 |
| 5,257,007 | 10/1993 | Steil et al. | 340/539 |

Primary Examiner—Curtis Kuntz
Assistant Examiner—Michael B. Chernoff
Attorney, Agent, or Firm—Wallenstein & Wagner, Ltd.

[57] ABSTRACT

A cordless telephone/radio-monitoring system to allow a user to listen to radio broadcasts, such as regional weather broadcasts, through the base unit of a cordless telephone as well as through the handset unit of a cordless telephone. In the event of a weather emergency, an alert signal from the National Weather Service will automatically be announced from both the base unit and the handset unit of the telephone to advise the user of the weather emergency.

14 Claims, 2 Drawing Sheets

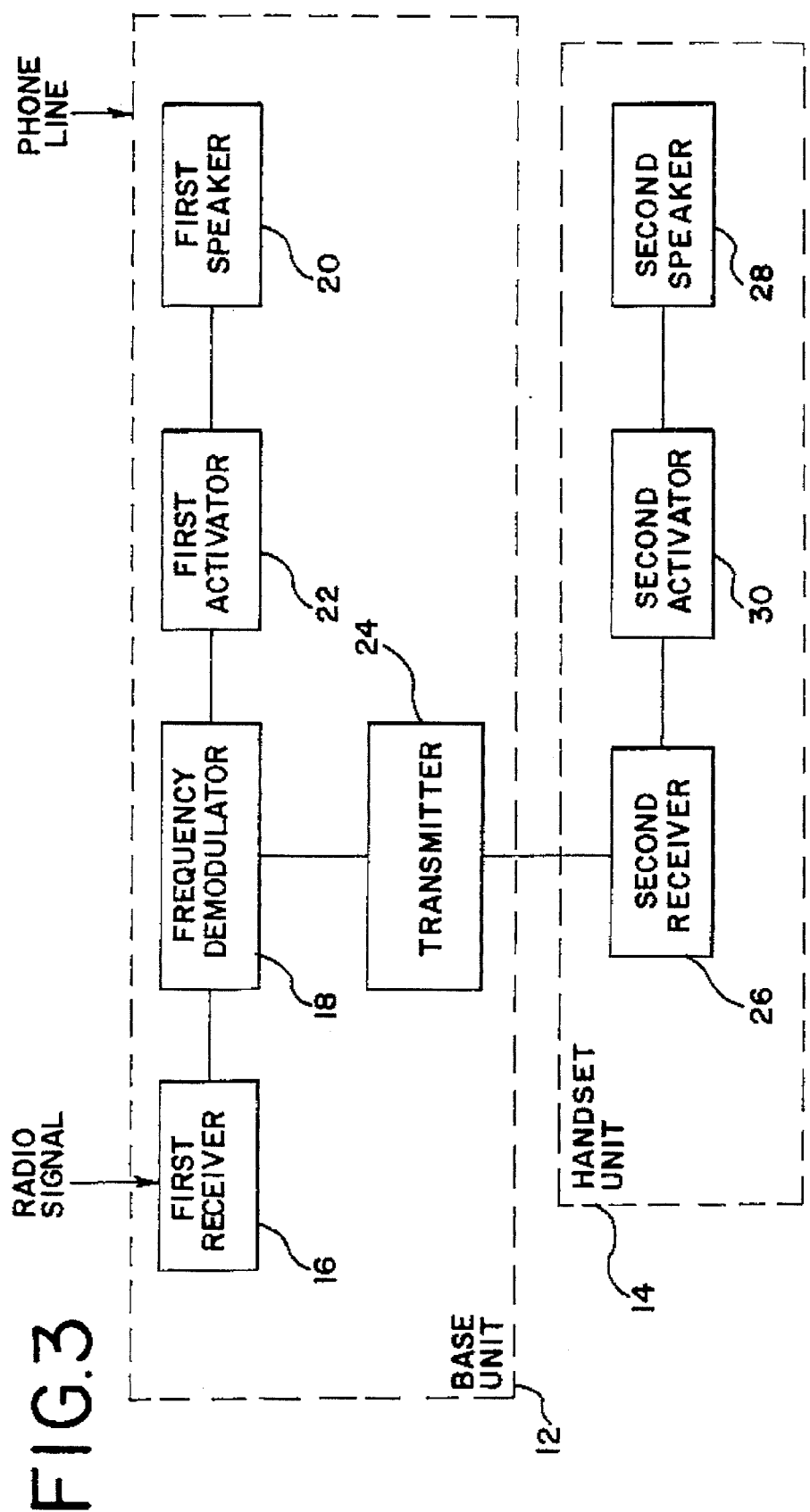

CORDLESS TELEPHONE/RADIO-MONITORING SYSTEM

TECHNICAL FIELD

The application relates to a cordless telephone system having a base unit and a handset unit which implements a broadcast radio receiver into the system so that radio broadcasts, such as the National Weather Service broadcast, may be monitored on the handset unit or the base unit, and that users are warned of emergency conditions.

BACKGROUND PRIOR ART

The National Weather Service broadcasts weather and weather emergencies across the United States using seven different regional weather channels. These seven channels range in frequency from 162.4 to 162.55 MHz and employ narrow band FM modulation. When a regional weather emergency exists, the weather service modulates a 1050 Hz tone on the appropriate 162 MHz weather frequency for 10 seconds to alert the public of an impending weather emergency. However, the 1050 Hz tone will not be heard by anyone who is not listening to a radio tuned to that local weather channel at 162 MHz, at the time of the emergency.

SUMMARY OF THE INVENTION

The present invention implements a weather radio receiver into a cordless telephone system to allow a user to hear the National Weather Service broadcast over the cordless telephone. A control allows the user to listen to the regional weather broadcast either from the base unit or from the handset unit. When a weather emergency exists, a 1050 Hz tone transmitted by the weather service will be announced through the base unit speaker as well as through the handset unit speaker regardless of whether the user is listening to the regional weather broadcast or is on the telephone at the time of the emergency.

BRIEF DESCRIPTION OF DRAWINGS

FIG. 3 is a block diagram illustrating a second embodiment of the system of FIG. 1.

DETAILED DESCRIPTION

Figure 1:
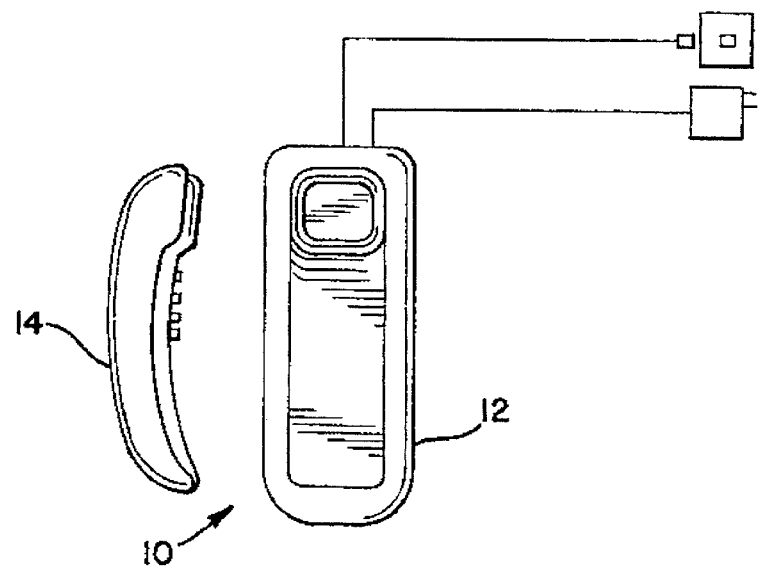
FIG. 1 is a perspective view of a cordless telephone/radio-monitoring system in accordance with the present invention.

While this invention is susceptible of embodiments in many different forms, there is shown in the drawings and will herein be described in detail, preferred embodiments of the invention with the understanding that the present disclosure is to be considered as exemplifications of the principles of the invention and is not intended to limit the broad aspects of the invention of the embodiments illustrated.

FIG. 1 is a perspective view of a telephone/radio-monitoring system, generally designated 10. The system 10 includes a base unit 12 which is coupled to a phone line, and a handset unit 14. The base unit 12 and the handset unit 14 include conventional components to transmit and receive voice communications from each other in conventional fashion.

The cordless telephone/radio-monitoring system 10 monitors a broadcast radio signal, e.g. a regional broadcast message from the National Weather Service. For example, a radio signal broadcast from the National Weather Service contains a regional weather broadcast with a carrier frequency of about 162 MHz. In the event of a weather emergency, the radio signal includes a 1050 Hz alert tone.

Figure 2:
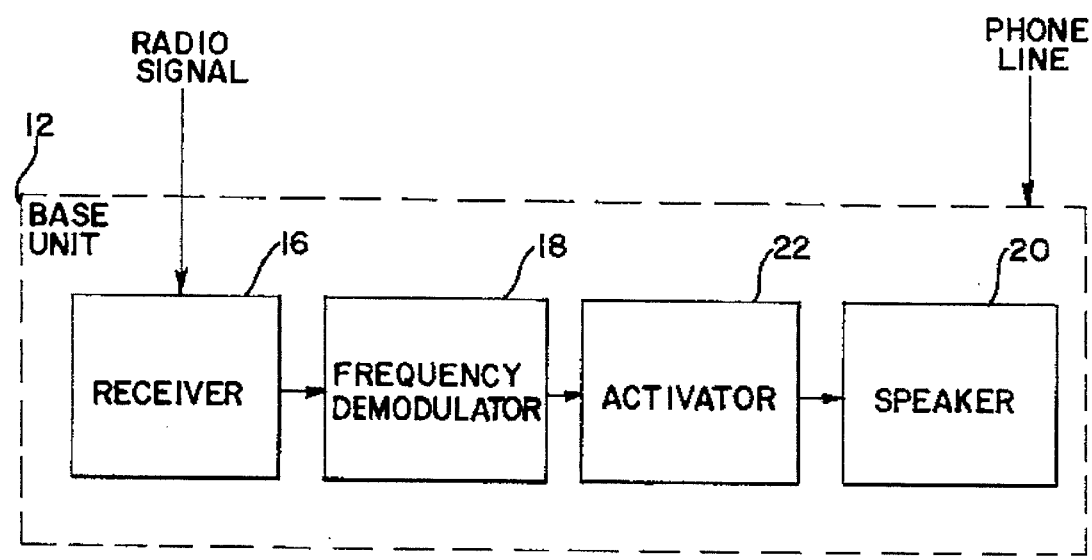
FIG. 2 is a block diagram illustrating one embodiment of the system of FIG. 1.

One embodiment of the method employed by the telephone/radio-monitoring system 10 is shown in block diagram form in FIG. 2. The base unit 12 includes a broadcast receiver 16, a frequency demodulator 18, a speaker 20, and an activator 22. The broadcast receiver 16 is selectively tunable to each of the seven National Weather Service broadcast frequencies, and receives the National Weather Service radio signal to which it is tuned. The frequency demodulator 18 demodulates the received radio signal. If the radio signal includes the intermittent alert signal, the speaker 20 automatically announces the alert signal. The user can also selectively activate the speaker 20 to broadcast the message signal at any time by using the activator 22. Although the components in this embodiment are implemented within the base unit 12, an alternative embodiment may implement the components within the handset unit 14.

Another embodiment of the method employed by the telephone/radio-monitoring system 10 is shown in block diagram form in FIG. 3. The base unit 12 includes the first broadcast receiver 16, the frequency demodulator 18, the first speaker 20, the first activator 22, and a transmitter 24. The handset unit 14 includes a second receiver 26, a second speaker 28 and a second activator 30. As discussed below, the second receiver 26 receives both the conventional voice communications signal from the base unit 12 as well as the broadcast signal from the base unit 12.

Specifically, the first broadcast receiver 16 within the base unit 12 receives the radio signal, and the frequency demodulator 18 demodulates the radio signal. The demodulated signal is then modulated to the carrier frequency of the cordless telephone, typically in the range between 43 MHz and 48 MHz, and sent from the transmitter 24 to the second receiver 26 within the handset unit 14.

If the radio signal includes the intermittent alert signal, the first speaker 20 and the second speaker 28 automatically announce the alert signal. The user can also selectively activate the first speaker 20 or the second speaker 28 to broadcast the message signal at any time by using the first activator 22 or the second activator 30, respectively. An alternative embodiment may reverse the components within the base unit 12 and the handset unit 14.

In accordance with the invention, the regional weather broadcast can be monitored at any time by activating either the base unit 12 or the handset unit 14. Further, in the event of a weather emergency, both the base unit 12 and the handset unit 14 announce the alert signal to indicate the presence of a weather emergency. Thereafter, a listener can activate either the base unit 12 or the handset unit 14 to monitor the weather broadcast.

It will be understood that the invention may be embodied in other specific forms without departing from the spirit or central characteristics thereof. The present embodiments, therefore, are to be considered in all respects as illustrative and not restrictive, and the invention is not to be limited to the details given herein.

I claim:

1. A cordless telephone/radio-monitoring system for monitoring a plurality of broadcast weather radio signals, each of said signals including a generally continuous weather message signal and a generally intermittent weather alert signal transmitted on the same carrier, the system comprising:

a handset unit; and a base unit to be coupled to a telephone line, wherein said base unit comprises:
  first receiving means for receiving each of the plurality of broadcast weather radio signals;
  means for selectively tuning said first receiving means to one of the plurality of broadcast weather radio signals;
  demodulating means for demodulating said selected one of the plurality of broadcast weather radio signals into a demodulated signal;
  a first speaker, wherein said first speaker automatically announces the weather alert signal; and
  first activating means for selectively activating said first speaker to announce the weather message signal.

2. A cordless telephone/radio-monitoring system as claimed in claim 1, wherein:
  said base unit further comprises:
    transmitting means for transmitting the demodulated signal to said handset unit; and
  said handset unit comprises:
    second receiving means for receiving the demodulated signal from said base unit;
    a second speaker, wherein said second speaker automatically announces the alert signal; and
    second activating means for selectively activating said second speaker to announce the message signal.

3. A cordless telephone/radio-monitoring system as claimed in claim 1, wherein the radio signal is carried on a frequency of about 162 MHz.

4. A cordless telephone/radio-monitoring system as claimed in claim 1, wherein the alert signal is a 1050 Hz tone.

5. A cordless telephone/radio-monitoring system as claimed in claim 2, wherein the demodulated signal is carried on a frequency generally in the range of 43 MHz to 48 MHz.

6. A cordless telephone/radio-monitoring system as claimed in claim 2, wherein said first activating means and said second activating means comprise push buttons.

7. A cordless telephone/radio-monitoring system for monitoring a plurality of broadcast weather radio signals, each of said broadcast weather radio signals including a generally continuous weather message signal and a generally intermittent weather alert signal transmitted on the same carrier, the system comprising:

a base unit to be coupled to a telephone line; and a handset unit comprising:
  first receiving means for receiving each of the plurality of broadcast weather radio signals;
  means for selectively tuning said first receiving means to one of the plurality of broadcast weather radio signals;
  demodulating means for demodulating said selected one of the plurality of broadcast weather radio signals into a demodulated signal;
  a first speaker, wherein said first speaker automatically announces the weather alert signal; and
  first activating means for selectively activating said first speaker to announce the weather message signal.

8. A cordless telephone/radio-monitoring system as claimed in claim 7, wherein:
  said handset unit further comprises:
    transmitting means for transmitting the demodulated signal to said base unit; and
  said base unit comprises:
    second receiving means for receiving the demodulated signal from said handset unit;
    a second speaker, wherein said second speaker automatically announces the alert signal; and
    second activating means for selectively activating said second speaker to announce the message signal.

9. A cordless telephone/radio-monitoring system for monitoring a plurality of broadcast weather radio signals, each of said broadcast weather radio signals including a generally continuous weather message signal and a generally intermittent weather alert signal transmitted on the same carrier, the system comprising:

a handset unit;

a base unit to be coupled to a telephone line;

one of said handset unit and said base unit comprising:
  first receiving means for receiving each of the plurality of broadcast weather radio signals;
  means for selectively tuning said first receiving means to one of the plurality of broadcast weather radio signals;
  demodulating means for demodulating said selected one of the plurality of broadcast weather radio signals into a demodulated signal; and
  transmitting means for transmitting the demodulated signal to the other of said handset unit and said base unit; and the other of said handset unit and said base unit comprising:
  second receiving means for receiving the demodulated signal from the one of said handset unit and said base unit;
  a first speaker, wherein said first speaker automatically announces the weather alert signal; and
  first activating means for selectively activating said first speaker to announce the weather message signal.

10. A cordless telephone/radio-monitoring system as claimed in claim 9, wherein the one of said handset unit and said base unit further comprises:
  a second speaker, wherein said second speaker automatically announces the alert signal; and
  a second activating means for selectively activating said second speaker to announce the message signal.

11. A cordless telephone/radio-monitoring system as claimed in claim 9, wherein the radio signal is carried on a frequency of about 162 MHz.

12. A cordless telephone/radio-monitoring system as claimed in claim 9, wherein the alert signal is a 1050 Hz tone.

13. A cordless telephone/radio-monitoring system as claimed in claim 9, wherein the demodulated signal is carried on a frequency generally in the range of 43 MHz to 50 MHz.

14. A cordless telephone/radio-monitoring system as claimed in claim 10, wherein said first activating means and said second activating means comprise push buttons.

* * * * *